US006557815B1

(12) United States Patent
Klein, II

(10) Patent No.: US 6,557,815 B1
(45) Date of Patent: May 6, 2003

(54) UNIVERSAL MOUNTING BRACKET FOR LASER TARGETING AND FEEDBACK SYSTEM

(75) Inventor: Richard J. Klein, II, Waterloo, IA (US)

(73) Assignee: University of Northern Iowa Research Foundation, Cedar Falls, IA (US)

( * ) Notice: Subject to any disclaimer, the term of this patent is extended or adjusted under 35 U.S.C. 154(b) by 0 days.

(21) Appl. No.: 09/730,241

(22) Filed: Dec. 5, 2000

(51) Int. Cl.[7] .................................................. F16M 13/00
(52) U.S. Cl. ....................... 248/635; 248/609; 248/620; 239/346
(58) Field of Search ............................ 248/635, 229.16, 248/294.1, 309.2, 292.14, 183.3, 609, 620, 346.03, 229.12, 229.17, 632, 608; 239/346, 289

(56) References Cited

U.S. PATENT DOCUMENTS

| | | | | | |
|---|---|---|---|---|---|
| 1,498,759 | A | | 6/1924 | Schmidt | |
| 2,115,653 | A | * | 4/1938 | Snyder | 248/635 |
| 2,488,789 | A | | 11/1949 | Williams | 299/88 |
| 3,155,320 | A | | 11/1964 | Jones | 239/289 |
| 3,784,804 | A | | 1/1974 | Sabatellie et al. | 240/2 |
| 4,291,839 | A | | 9/1981 | Brett | 239/289 |
| 4,583,694 | A | | 4/1986 | Williams et al. | 239/690 |
| 4,899,937 | A | | 2/1990 | Haruch | 239/289 |
| 5,069,389 | A | | 12/1991 | Bitsakos | 239/289 |
| 5,090,650 | A | | 2/1992 | Donaldson et al. | 248/183 |
| 5,134,798 | A | | 8/1992 | Lee | 42/100 |
| 5,251,822 | A | * | 10/1993 | Wang | 239/346 |
| 5,303,896 | A | * | 4/1994 | Sterka | 244/54 |
| 5,335,893 | A | * | 8/1994 | Opp | 248/632 |
| 5,366,200 | A | * | 11/1994 | Scura | 248/632 |
| 5,566,047 | A | * | 10/1996 | Kahn et al. | 174/138 G |
| 5,590,484 | A | | 1/1997 | Mooney et al. | 42/100 |
| 5,590,486 | A | | 1/1997 | Moore | 42/103 |
| 5,598,972 | A | | 2/1997 | Klein, II et al. | 239/1 |
| 5,757,498 | A | | 5/1998 | Klein, II et al. | 356/375 |
| 5,785,115 | A | * | 7/1998 | Laveran | 165/149 |
| 5,810,258 | A | | 9/1998 | Wu | 239/346 |
| 5,857,625 | A | | 1/1999 | Klein et al. | 239/289 |
| 5,868,840 | A | | 2/1999 | Klein, II et al. | 118/300 |
| 5,951,296 | A | | 9/1999 | Klein | 434/84 |
| 5,959,642 | A | * | 9/1999 | Fujioka et al. | 248/635 |

* cited by examiner

*Primary Examiner*—Anita King
*Assistant Examiner*—Tan Le
(74) *Attorney, Agent, or Firm*—Andrus, Sceales, Starke & Sawall, LLP

(57) ABSTRACT

A support bracket for mounting a device such as a laser targeting and feedback system to a spray gun. The bracket includes a bolt having a threaded end, a first collar disposed on the bolt opposite the threaded end and a second collar threadably engaged with the threaded end of the bolt. A compressible member is disposed on the bolt between the collars. Opposite the compressible member, a support arm used to support the device is attached to the second collar. The bracket is engageable with a portion of the spray gun body and is engaged therewith by deflecting the compressible member between the collars such that the compressible member frictionally engages the spray gun. The use of the compressible member to secure the bracket to the hook allows the bracket to be utilized with spray guns having various configurations so long as the spray gun incorporates a portion on the spray gun body that is engageable by the compressible member.

18 Claims, 4 Drawing Sheets

UNIVERSAL MOUNTING BRACKET FOR LASER TARGETING AND FEEDBACK SYSTEM

FIELD OF THE INVENTION

The present invention relates to spray guns, such as paint spray guns, and more specifically to mounting brackets for attaching items to the spray gun.

BACKGROUND OF THE INVENTION

Spray guns have long been used to coat objects with a liquid spray, such as paint, varnish, etc. The spray gun allows a pressurized stream of the liquid spray coating to be applied to the object in a quick and easy manner.

With many of these coatings, it is important to apply the coating evenly to the surface to avoid overspray of the coating and/or leaving uncoated sections on the surface of the object. In order to apply the coating evenly over the entire surface of the object, in many instances it is necessary to position the spray gun a optimum distance from the object to ensure the proper coverage of the object with the coating. However, because spray guns are normally manually operated, variations in the distance between the spray gun and the surface of the object to be coated during the coating process are usually unavoidable.

To reduce the detrimental effects of this distance variation, devices have been developed that effectively measure the distance between the tip of the spray gun and the object surface to ensure that the spray gun is positioned at the optimal distance from the surface, helping ensure proper coverage of the object with the coating. One such device is a laser targeting and feedback device that can be mounted directly to the spray gun.

However, due to the numerous configurations of the spray guns currently in use, a number of different mounting assemblies have resulted that each secure a laser targeting feedback system to a particular spray gun design. For example, Klein, II et al. U.S. Pat. No. 5,757,498 discloses an optical spray coating monitoring system and method. This system includes a sensor head including a bracket used to removably attach the sensor head to a boom extending from the spray gun. The bracket includes a pair of downwardly depending flanges adapted to receive and engage the boom and including adapted to receive a threaded bolt beneath the boom. When the bracket is properly positioned about the boom, a nut threadably engaged to one end of the bolt is tightened on the bolt to compress the bracket into engagement with the boom to fixedly secure the sensor head on the spray gun.

Similar arrangements for other mounting assemblies used to secure other types of devices to spray guns can be found in Sabatelli et al. U.S. Pat. No. 3,784,804 and Brett U.S. Pat. No. 4,291,839. In each of these patents, the mounting assembly is adapted specifically for use with a certain type of paint spray gun configuration, limiting the use of the mounting assembly to that particular gun configuration. As a result, when using a device incorporating a specific mounting assembly, including a laser targeting and feedback system, use of that device is limited to paint spray guns having a configuration compatible with that particular mounting assembly. Furthermore, as each mounting assembly disclosed in the above-mentioned patents utilizes the frictional engagement of a clamping bracket with the spray gun, in many cases the bracket can slide or rotate with respect to the spray gun, thereby placing the device out of alignment with the spray gun. If the device is a laser targeting system, any movement of the device will result in the coating being applied to the object in a less than optimal manner.

Therefore, it is desirable to develop a mounting bracket that can securely mount a device such as a laser targeting and feedback system to a spray gun and is capable of being utilized with spray guns having a number of different configurations.

SUMMARY OF THE INVENTION

It is an object of the present invention to provide a mounting bracket that can be used with spray guns of varying configurations to support a device, such as a laser targeting and feedback system, on the spray gun.

It is a further object of the invention to provide a mounting bracket that employs a resilient, compressible member capable of frictionally engaging the spray gun to provide a secure attachment of the bracket and device to the spray gun.

It is still a further object of the invention to provide a mounting bracket that allows the device secured to the bracket to be adjusted with respect to the bracket in order to properly position the device with respect to the nozzle of the spray gun.

It is still another object of the invention to provide a mounting bracket that has a simple and inexpensive construction and is easy to assemble and use.

The present invention is a mounting bracket used to support a device, e.g., a laser targeting and feedback system, on a spray gun that can be secured to spray guns of various configurations that include an upstanding hook used to hang the spray gun in a storage location when not in use. The bracket comprises a bolt having at least one collar disposed at one end and a compressible member disposed on the bolt between the collar and a head on the bolt. The bolt is adjustably and threadably attached to the collar such that the threaded collar may move along the threaded end of the bolt to compress the member between the bolt head and the collar and engage the spray gun.

Opposite the compressible member, the threaded collar is also attached to a support arm having a first leg attached to the collar and a second leg extending generally perpendicularly from the first leg. The first leg of the support arm is adjustably attached to the threaded collar and the device is adjustably attached to the second leg. This allows the position of the first leg of the support arm to be adjusted relative to the threaded collar and the position of the device to be adjusted relative to the second leg of the support arm to precisely position the device relative to the spray gun.

Various other features, objects and advantages of the invention will be made apparent from the following detailed description taken together with the drawings.

BRIEF DESCRIPTION OF THE SEVERAL VIEWS OF THE DRAWING

The drawings illustrate the best mode presently contemplated of carrying out the invention.

In the drawings.

DETAILED DESCRIPTION OF THE DRAWINGS

Figure 1:
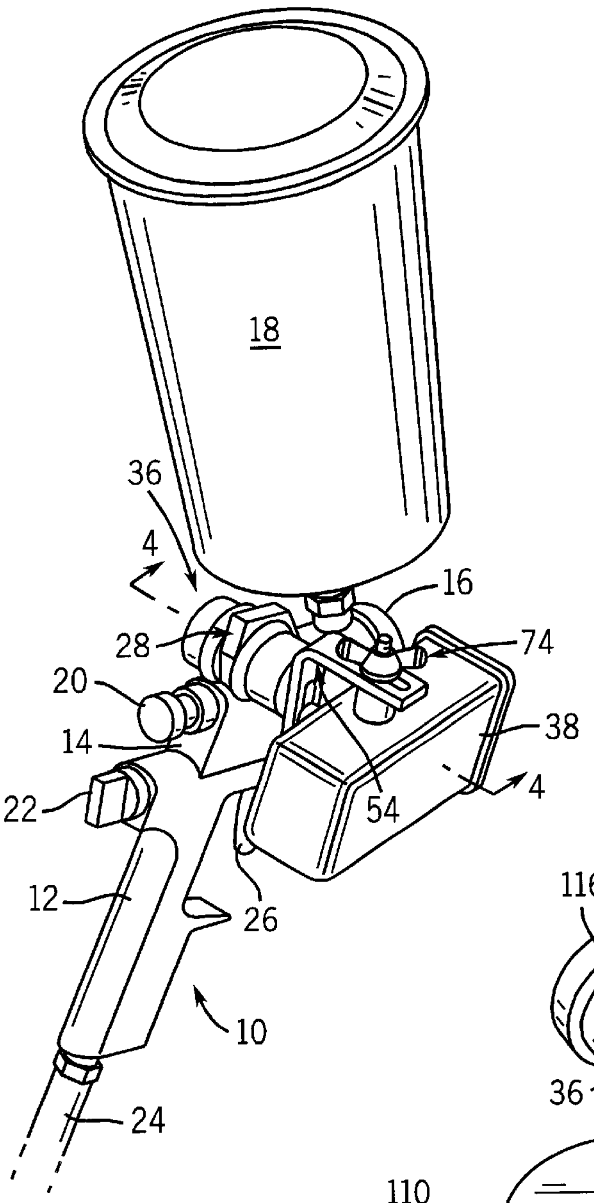
FIG. 1 is an isometric view of a paint spray gun to which a laser targeting and feedback system has been attached utilizing the mounting bracket of the present invention.

With reference now to the drawing figures in which like reference numerals designate like parts throughout the disclosure, a paint spray gun indicated generally at 10 is illustrated in FIG. 1. The spray gun 10 includes a handle 12, a body portion 14 extending from the upper end of the handle 12 and a nozzle 16 extending from the body portion 14 opposite the handle 12. A paint container 18 is secured to the body portion 14 and provides a supply of paint to the spray gun 10. A control knob 20 is located at the rear of the body portion 14 spaced from the paint container 18 to control the flow of paint from the container 18 into the spray gun 10. Below the knob 20, the handle 12 also includes a valve control switch 22 at the rear of the handle that controls the flow of compressed air through a hose 24 connected to the bottom of the handle 12. Once the paint flow and air flow are properly adjusted by using the knob 20 and the switch 22, a person can activate the gun 10 and discharge the paint and compressed air by squeezing a downwardly-extending trigger 26 pivotally attached to the body portion 14 and spaced from the handle 12.

As best shown in FIGS. 2–5, the spray gun 10 also includes an upstanding hook 28 extending upwardly from the body portion 14 opposite the handle 12. The hook 28 includes a base 30 attached to the upper surface of the body portion 14 and a forwardly curving portion 32 extending outwardly from the base 30 and forwardly towards the nozzle 16. The base 30 and the curving portion 32 have a continuous inner face 33 and cooperate to define a generally circular recess 34 within the hook 28 that receives a peg (not shown) or other support on which the spray gun 10 can be hung when not in use.

A mounting bracket, indicated generally at 36, is adapted to securely engage the inner face 33 of the hook 28 and support a device 38 on the spray gun 10. The device 38 can be any of a number of attachments for the spray gun 10, including a laser targeting and feedback system of conventional construction and operation, and illustratively may be system as manufactured by Laser Touch and Technologies, LLC of Cedar Falls, Iowa under its part number LT-B512, LP112353, although it is understood that other suitable targeting and feedback systems can be used.

The bracket 36 includes a threaded bolt 40, having a head 40*a* and a threaded end 40*b* opposite the head 40*a*, that supports a washer 41 adjacent the head 40*a*, a first collar 42 adjacent the washer 41, a pair of compressible members 44 adjacent the first collar 42, and a second collar 46 adjacent the compressible members 44 and opposite the first collar 42. The first collar 42 and compressible members 44 each include a generally smooth central axial opening 48, 52, respectively, that are alignable to slidably receive the bolt 40. The central openings 48, 52 are also alignable with a threaded axial opening 50 extending through the center of the second collar 46 that receives and engages the threaded end 40*b* of the bolt 40.

The compressible members 44 are formed of a resilient deformable material, such as a rubber, (other suitable materials), and include an inner reduced diameter portion 44*a* and having an outer enlarged diameter portion 44*b* at one end. Each outer portion 44*b* is preferably integrally formed with the inner portion 44*a* and abuts the adjacent first collar 42 or second collar 46, with the inner portions 44*a* of each member 44 abutting one another. Alternatively, the inner portions 44*a* may be integrally formed to form a single compressible member 44 having a single inner portion 44*a* and a pair of outer portions 44*b* at each end abutting the respective collars. As a further alternative, the compressible member could be comprised of two reduced diameter portions and two separate enlarged diameter portions.

Opposite the compressible members 44, the second collar 46 is also attached to a support arm 54. The support arm 54 is generally L-shaped and includes a first leg 56 engaged with the second collar 46 and a second leg 58 extending generally perpendicularly to the first leg 56 from a bend 60 located at one end of the first leg 56.

The first leg 56 includes a longitudinal slot 62 that is adapted to receive a screw 64. The screw 64 is inserted through the slot 62 and is threadably engaged with a bore 66 in the second collar 46 spaced from the threaded opening 50. A washer 68 is disposed between the screw 64 and the first leg 56 such that when the screw 64 engages the bore 66, the screw 64, through the washer 68, compresses the first leg 56 into frictional engagement with the second collar 46 opposite the compressible members 44. When the screw 64 is partially disengaged from the bore 66, the first leg 56 may slide along the longitudinal slot 62 with respect to the second collar 46, allowing the first leg 56 and laser system 38 to be positioned anywhere along the slot 62 relative to the second collar 46.

Alternatively, the longitudinal slot 62 may be replaced by a plurality of spaced holes (not shown) extending along the length of the first leg 56. The bolt 40 extends through one of the holes on the first leg 56 and is secured therein by a washer (not shown) and a nut (not shown) secured to the bolts, opposite the compressible member 44. By tightening the nut on the bolt 40, the first leg 56 and second collar 46 can be drawn towards the first collar 42 to actually compress the compressible member into engagement with the hook 28. In this embodiment, the second collar 46 may also be removed such that the first leg 56 of the support arm 54 directly contacts the outer portion 44*b* of the compressible member.

The second leg 58 of support arm 54 also includes a longitudinal slot 70 similar to slot 62 in first leg 56. A threaded bolt 72 protruding from one side of the system 38 extends through the slot 70 in the second leg 58. A wing nut 74 having a pair of finger grasping sections 76, 78 is threadably engaged with the end of the threaded bolt 72 extending past the second leg 58 to secure the system to the second leg 58. An individual may grasp the finger grasping sections 76, 78 and manually rotate the wing nut 74, engaging the wing nut 74 with the bolt 72 and compressing the wing nut 74 and bolt 72 against opposite sides of the second leg 58 of the support arm 54. Similarly to the screw 64, the wing nut 74 can also be partially disengaged from the bolt 72 to allow the wing nut 74, bolt 72 and system 38 to be slid along the slot 70 in order to position the system 38 as desired.

Figure 2:
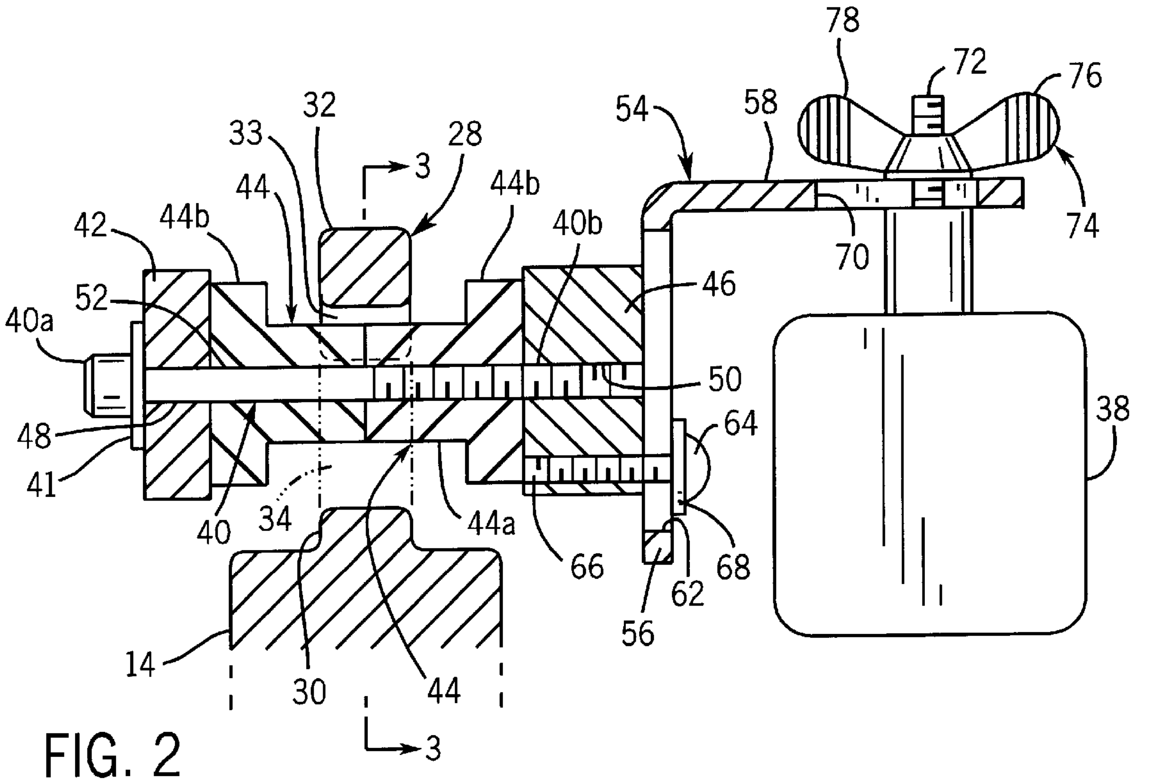
FIG. 2 is a cross-sectional view illustrating the mounting bracket and laser system positioned within but not engaged with an upstanding hook on the paint spray gun.
Figure 3:
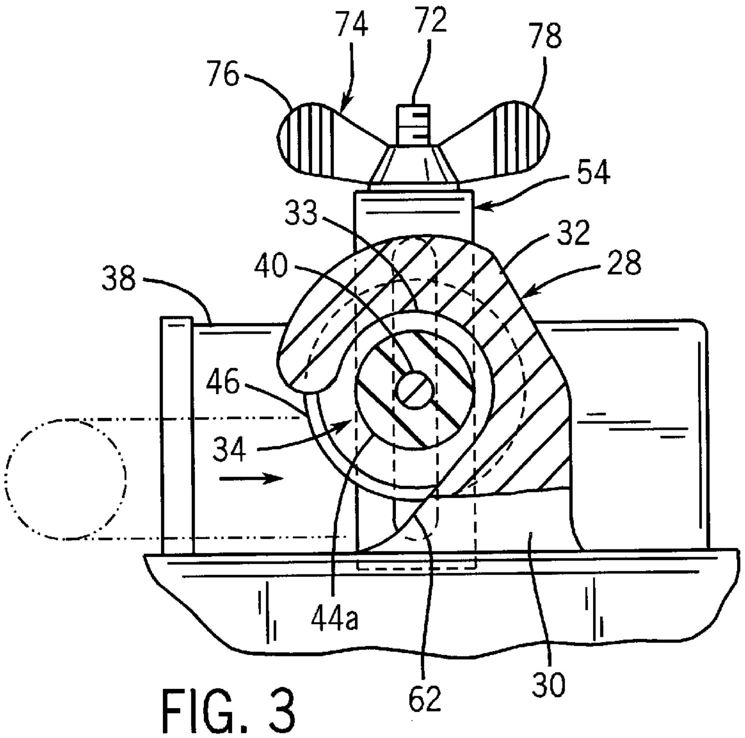
FIG. 3 is a cross-sectional view along line 3—3 of FIG. 2.
Figure 4:
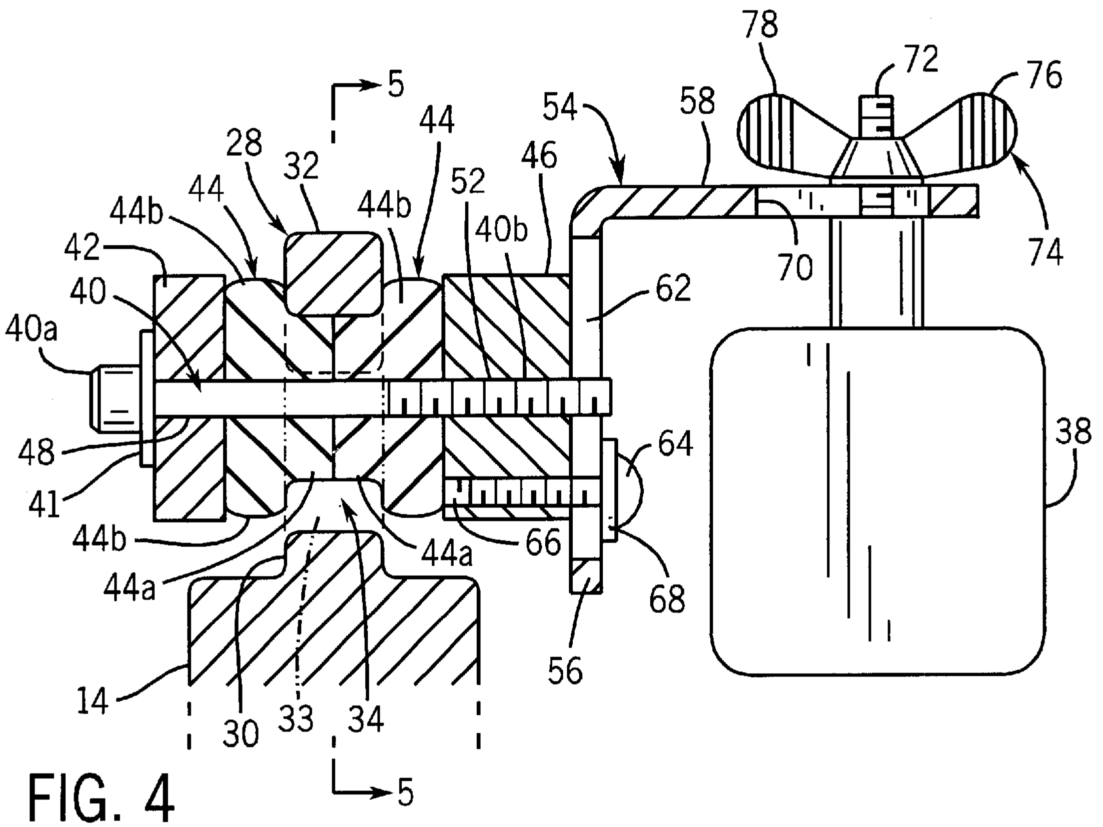
FIG. 4 is a cross-sectional view along line 4—4 of FIG. 1.
Figure 5:
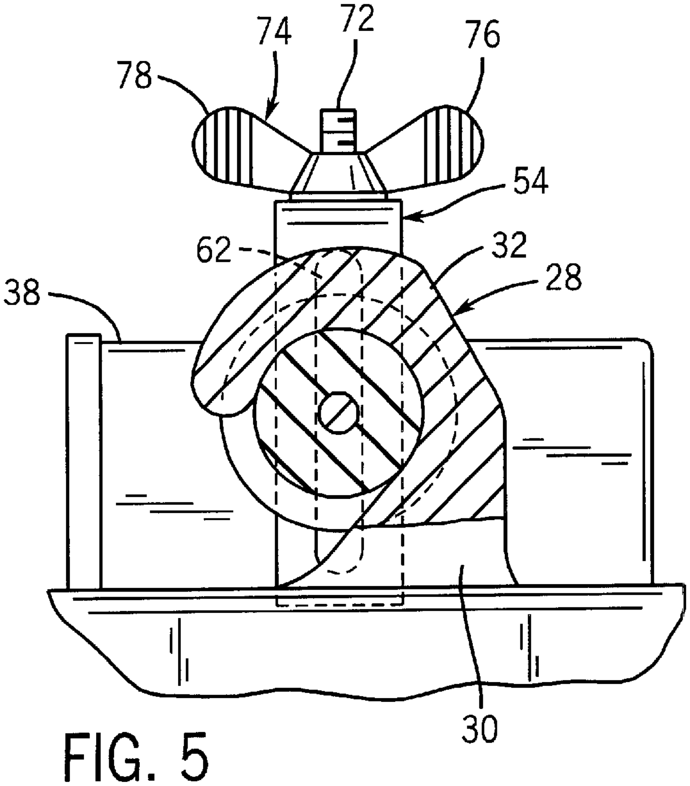
FIG. 5 is a cross-sectional view along 5—5 of FIG. 4.

To secure the bracket 36 to the gun 10, initially the bracket 36 is positioned to place the compressible members 44 within the upstanding hook 28. This is accomplished by placing the compressible members 44 in the position shown in FIG. 3 such that the inner portion 44*a* of each compressible member 44 is disposed within the recess 34 defined by the hook 28, and each outer portion 44*b* is located to one side of the hook 28 as best shown in FIGS. 2 and 3. The bolt 40 is then rotated with respect to the threaded opening 50 in the second collar 46 such that the engagement of the threaded end 40*b* of the bolt 40 and opening 50 draws the first collar 42 and second collar 46 toward one another. As the first collar 42 and second collar 46 move towards each other, the compressible members 44 are axially compressed such that the inner portions 44*a* expand radially outwardly to frictionally contact the inner surface 33 of the base 30 and forwardly curving portion 32, and each outer portion 44*b* frictionally engages one side of the hook 28, as shown in FIGS. 4 and 5. The bolt 40 is rotated until the frictional engagement of the respective portions of the compressible member 44 rigidly secures the bracket 36 within the hook 28. At this point, the position of the support arm 54 with respect to the second collar 46 can be adjusted by loosening the screw 64 and sliding the first leg 56 of the arm 54 along the slot 62. The bracket 36 can also be secured to the second collar 46 in an inverted position to accommodate certain types of spray guns by removing the screw 64 from the second collar 46 and bracket 36, rotating the bracket 180° such that the slot 62 is aligned with the opening 50, and inserting the screw 64 through the slot 62 and into the opening 50.

Once the bracket 36 is attached to the hook 28, the laser system 38 can be secured to the bracket 36. To do so, the first leg 56 of the support arm 54 is secured to the second collar 46 with the screw 64. The system 38 is then secured to the second leg 58 of the support arm 54 by inserting the bolt 72 extending from the system 38 through the slot 70 in the second leg 58 and engaging the wing nut 74 with the bolt 72. The position of the system 38 on the second leg 58 can be adjusted by loosening the wing nut 74 and sliding the bolt 72 and system 38 along the slot 70 in the second leg 58.

To remove the bracket 36 from the hook 28, the threaded end 40*b* of the bolt 40 is rotated to partially disengage the bolt 40 from within the threaded opening 50 such that the first collar 42 and the second collar 46 move away from one another. This enables the compressible members 44 to disengage from the hook 28 and return to their uncompressed state. The bracket 36 then may be removed from the hook 28 by displacing the compressible member 44 from within the recess 34 of the hook 28.

Figure 6:
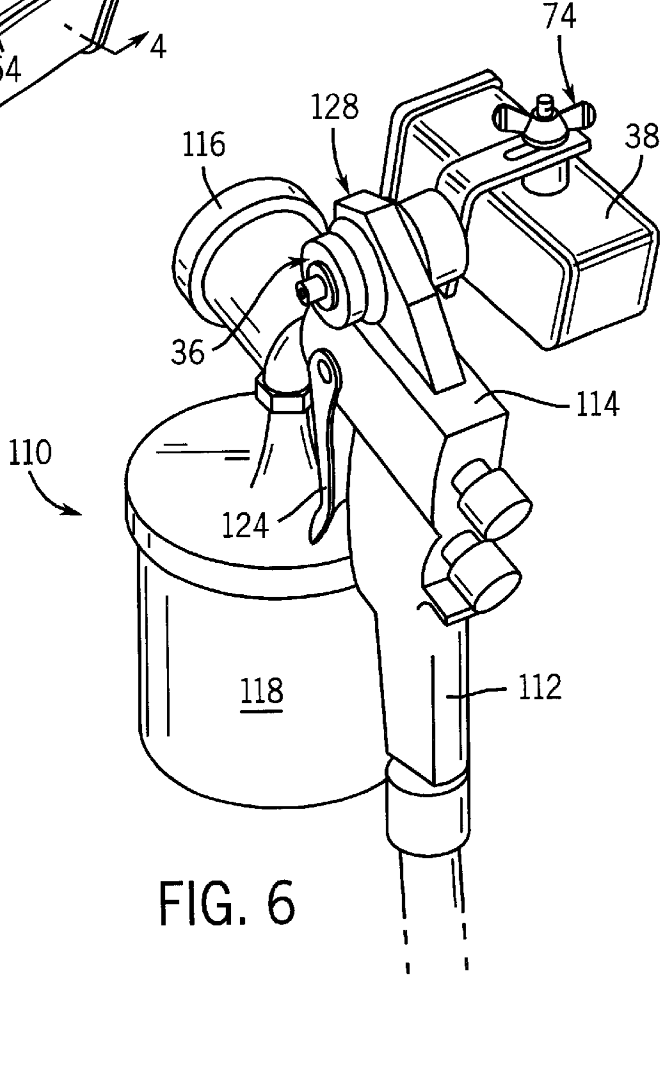
FIG. 6 is an isometric view of a paint spray gun having a different configuration to which a laser targeting and feedback system has been attached utilizing the mounting bracket of FIG. 1.

The configuration and method of attachment of the bracket 36 enables the bracket 36 to securely attach a system 38 to any type of spray gun that includes in its overall configuration an upstanding hook 28 similar to that found on the spray gun 10 shown in FIG. 1. For example, referring now to FIG. 6, a spray gun 110 is illustrated that includes a handle 112, a body portion 114 disposed at one end of the handle 112, and a nozzle 116 extending from the body portion 114 opposite the handle 112. A paint container 118 used to supply paint to the spray gun 110 is attached to and depends downwardly from the body portion 114. The spray gun 110 also includes a trigger 126 attached to the body portion 114 and located adjacent the container 118 that is used to activate the spray gun 110. Opposite the trigger 126, an upstanding hook 128 having a shape similar to the hook 28 on the spray gun 10 in FIG. 1 is disposed. As shown in FIG. 6, the bracket 36 can be positioned within the hook 128 in a manner identical to that described above and secured therein to securely position a system 38 on the spray gun 110.

Figure 7:
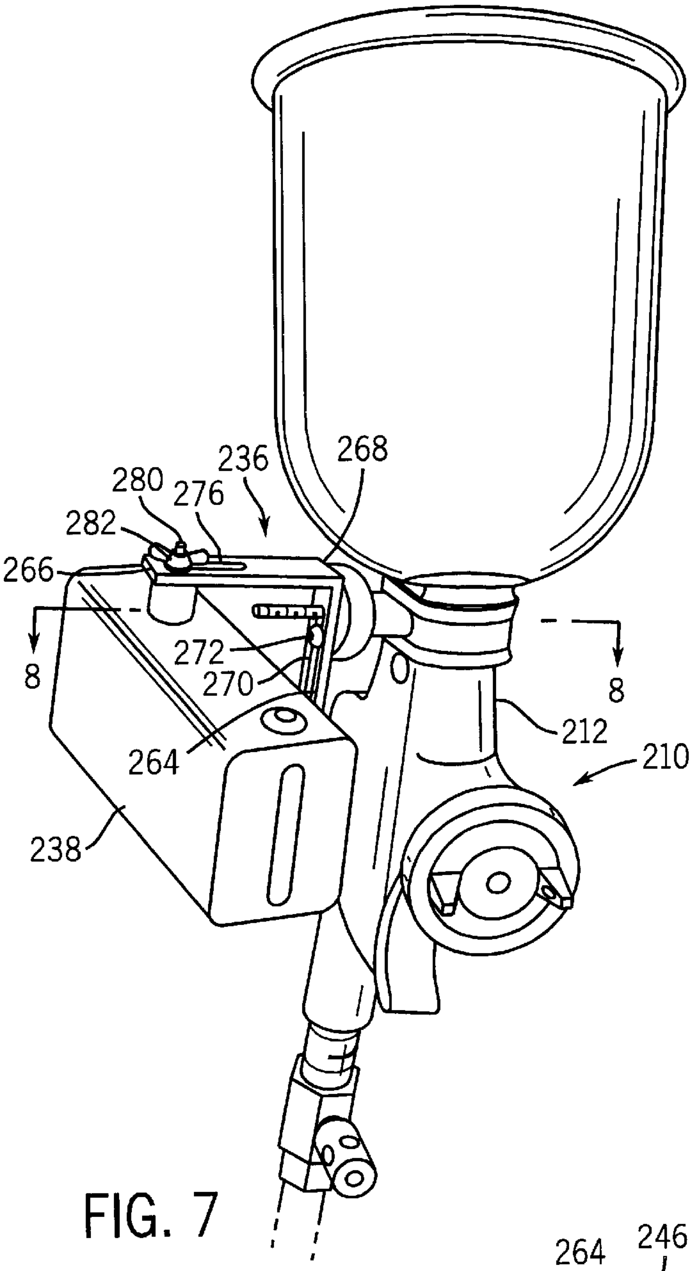
FIG. 7 is an isometric view of a second embodiment of the mounting bracket of the present invention secured to a paint spray gun.
Figure 8:
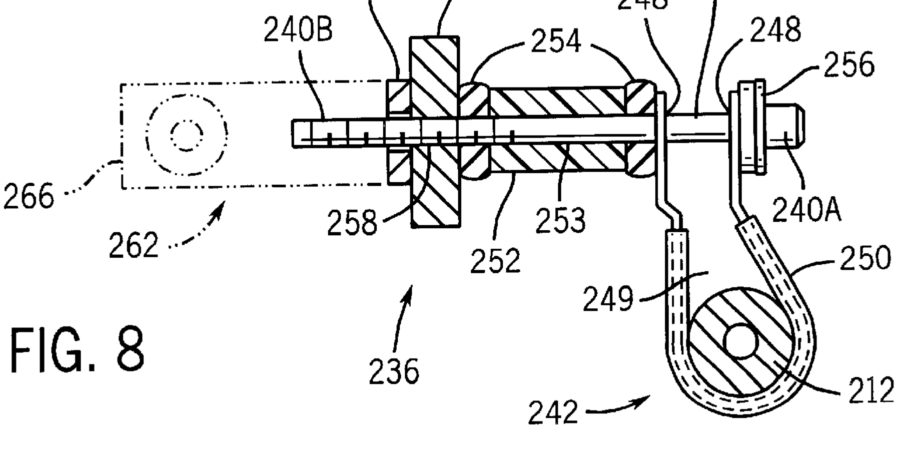
FIG. 8 is a cross-sectional view along line 8—8 of FIG. 7.

As shown in FIGS. 7 and 8, a second embodiment of the present invention is disclosed. A mounting bracket 236 is shown attached to a gravity feed spray gun 210. The bracket 236 is attached to a feed inlet 212 of the spray gun 210 that is generally cylindrical in shape.

The bracket 236 supports a laser system 238 on the spray gun 210 in a manner similar to the previous embodiment. A bracket 236 includes a bolt 240 having a head 240A at one end and a threaded end 240B spaced from the head 240A. A strap 242 is positioned on the bolt 240 between the head 240A and a collar 246 threadably disposed on the bolt 240 opposite the head 240A. The strap 242 is formed of a semi-rigid, resilient material and includes a pair of circular openings 248 at opposite ends. Each opening 248 is positioned around the bolt 240 such that the strap 242 forms a generally U-shape and encloses a loop 249 between the bolt 240 and the strap 242. The strap 242 also includes a cover 250 that extends along the strap 242 between the openings 248 to cover the side of the strap 242 facing the bolt 240. The cover 250 is formed of a flexible counter resilient material, such as rubber and prevents the strap 242 from rubbing against and damaging the feed inlet 212 when the strap 242 is engaged with the inlet 212.

The strap 242 is spaced from the threaded end 240B of the bolt 240 and the collar 246 by a spacer 252 disposed on the bolt 240 and a pair of washers 254 located adjacent each end of the spacer 252. The spacer 252 is formed of a substantially rigid material, such as a metal or hard plastic, and has a generally cylindrical shape that defines a central, axial passage 253 therein. The strap 242 is retained on the bolt 240 by the insertion of the bolt 240 through the openings 248 and by the engagement of the strap 242 with the spacer 252 at one end and a rigid fixed washer 256 disposed adjacent the head 240A at the opposite end.

The collar 246 is formed similarly to the collars of the previous embodiment and includes a central opening 258 that engages the threaded end 240B of the bolt 240. The collar 246 also includes a threaded bore (not shown) radially spaced from the central opening 258. The position of the collar 248 on the threaded end 240B of the bolt 240 can be adjusted to move the spacer 252 along the bolt 240 and compress the strap 242 against the feed inlet 212 to removably secure the strap 242 and bracket 238 to the spray gun 210.

The bracket 236 also includes a support arm 262 having a first portion 264 and a second portion 266 joined by a bend 268. The first portion 264 includes a longitudinal slot 270 that is adapted to receive a screw 272 inserted through the slot 270 and a washer 274 positioned over the slot 270, the screw 272 releasably engageable within the threaded bore on the collar 246. The engagement of the screw 272 within the threaded bore enables the support arm 262 to be supported by the collar 246 and bolt 240. Furthermore, similar to the previous embodiment, the screw 272 may be loosened to enable the first portion 264 of the support arm 262 to slide with respect to the threaded bore and collar 246 to adjust the position of the support arm 262 relative to the collar 246 and bolt 240.

The second portion 266 of the support arm 262 includes a second longitudinal slot 276. The second slot 276 is adapted to receive a threaded bolt 280 protruding from the laser system 238 such that the bolt 280 can be inserted through the second slot 276 and engaged with a wing nut 282 opposite the system 238 to releasably and adjustably secure the laser system 238 to the support arm 262.

Various alternatives and embodiments are contemplated as being within the scope of the following claims particularly pointing out and distinctly claiming the subject matter regarded as the invention.

I claim:

1. A support for adjustably securing a device to a spray gun, the gun including a body portion supporting an upstanding hook defining an interior recess, a feed inlet tube and a nozzle extending from the body portion, the support comprising:

a first substantially rigid collar;

a second substantially rigid collar;

a bolt interconnecting the first rigid collar and the second rigid collar and adapted to draw said collars together along the bolt axis;

at least one compressible member disposed on the bolt between the first and second collars, said compressible member adapted to engage a portion of the spray gun in response to said collars being drawn together;

an adjustable bracket secured to the second collar opposite the compressible member adapted to support the device on the bracket apart from the spray gun;

a third substantially rigid collar disposed on the bolt against the first collar between the first collar and the compressible member; and wherein the bolt is threadedly engaged with the second collar.

2. The support of claim 1 wherein the compressible member includes an inner, reduced diameter portion and a pair of outer enlarged diameter portions at either end of the inner portion that abut the first and second collars, respectively.

3. The support of claim 2 wherein the compressible member has a central, axial opening adapted to receive the bolt.

4. The support of claim 3 wherein the compressible member is formed of a resilient material.

5. The support of claim 4 wherein the compressible member is formed of a rubber.

6. The support of claim 1 wherein the compressible member is formed of a pair of compressible sections, each section including a inner portion and an outer portion at one end of the inner portion, the respective inner portions abutting one another and the outer portions abutting the first and second collars.

7. The support of claim 1 wherein the second collar further includes a threaded bore spaced from and parallel to the axis of the bolt that receives a threaded member inserted through a slot in the bracket.

8. The support of claim 1 wherein the first collar is a washer.

9. The support of claim 1 further comprising a substantially rigid spacer slidably disposed on the bolt between the compressible member and the second collar.

10. A mounting bracket for releasably attaching a device to a spray gun, the spray gun including an upstanding hook defining an interior recess and a feed inlet tube on a body portion of the spray gun, the bracket comprising;

a bolt;

a first collar secured to one end of the bolt;

a second collar secured to the bolt opposite the first collar adapted to be drawn by the bolt towards the first collar;

at least one compressible member disposed on the bolt between the first collar and the second collar, said compressible member engageable with the body of the spray gun in response to drawing the first and second collars together;

a support arm secured to the second collar opposite the compressible member, the arm including an opening adapted for the attachment of the device to the support arm;

a third collar attached to the bolt against the first collar between the first collar and the compressible member; and wherein the support arm includes a first leg secured to and selectively rotatable with respect to the second collar and a second leg extending generally perpendicularly from the first leg; and wherein the first leg of the arm includes a longitudinal slot alignable with a bore in the second collar, and the bore is disposed adjacent the periphery of the second collar and is adapted to receive a threaded member inserted through the slot.

11. The bracket of claim 10 wherein the opening is disposed in the second leg.

12. The bracket of claim 11 wherein the opening is a longitudinally extending aperture.

13. The bracket of claim 12 wherein the aperture is adapted to adjustably secure the device to the bracket.

14. A support for adjustably securing a device to a spray gun, the gun including a body portion supporting an upstanding hook defining an interior recess, a feed inlet tube and a nozzle extending from the body portion, the support comprising:

a first substantially rigid collar;

a second substantially rigid collar;

a bolt interconnecting the first rigid collar and the second rigid collar and adapted to draw said collars together along the bolt axis;

at least one compressible member disposed on the bolt between the first and second collars, said compressible member adapted to engage a portion of the spray gun in response to said collars being drawn together;

an adjustable bracket secured to the second collar opposite the compressible member adapted to support the device on the bracket apart from the spray gun; and wherein the compressible member is an elongate strap attached to the bolt at opposite ends of the strap.

15. The support of claim 14 wherein the strap is formed of a strip of flexible material.

16. The support of claim 14 wherein the strap includes a sheath extending between each end of the strap.

17. A support for adjustably securing a device to a spray gun, the gun including a body portion supporting an upstanding hook defining an interior recess, a feed inlet tube and a nozzle extending from the body portion, the support comprising:

a first substantially rigid collar;

a second substantially rigid collar;

a bolt interconnecting the first rigid collar and the second rigid collar and adapted to draw said collars together along the bolt axis;

at least one compressible member disposed on the bolt between the first and second collars, said compressible member adapted to engage a portion of the spray gun in response to said collars being drawn together;

an adjustable bracket secured to the second collar opposite the compressible member adapted to support the device on the bracket apart from the spray gun; and wherein the bolt is threadably engaged with the second collar; and wherein the second collar further includes a threaded bore spaced from and parallel to the axis of the bolt that receives a threaded member inserted through a slot in the bracket.

18. A mounting bracket for releasably attaching a device to a spray gun, the spray gun including an upstanding hook defining an interior recess and a feed inlet tube on a body portion of the spray gun, the bracket comprising;

a bolt;

a first collar secured to one end of the bolt;

a second collar secured to the bolt opposite the first collar adapted to be drawn by the bolt towards the first collar;

at least one compressible member disposed on the bolt between the first collar and the second collar, said compressible member engageable with the body of the spray gun in response to drawing the first and second collars together;

a support arm secured to the second collar opposite the compressible member, the arm including an opening adapted for the attachment of the device to the support arm; and the support arm includes a first leg secured to and selectively rotatable with respect to the second collar, and a second leg extending generally perpendicularly from the first leg; and the first leg of the arm includes a longitudinal slot alignable with a bore in the second collar, and the bore is disposed adjacent the periphery of the second collar and is adapted to receive a threaded member inserted through the slot.

* * * * *